Figure 1:
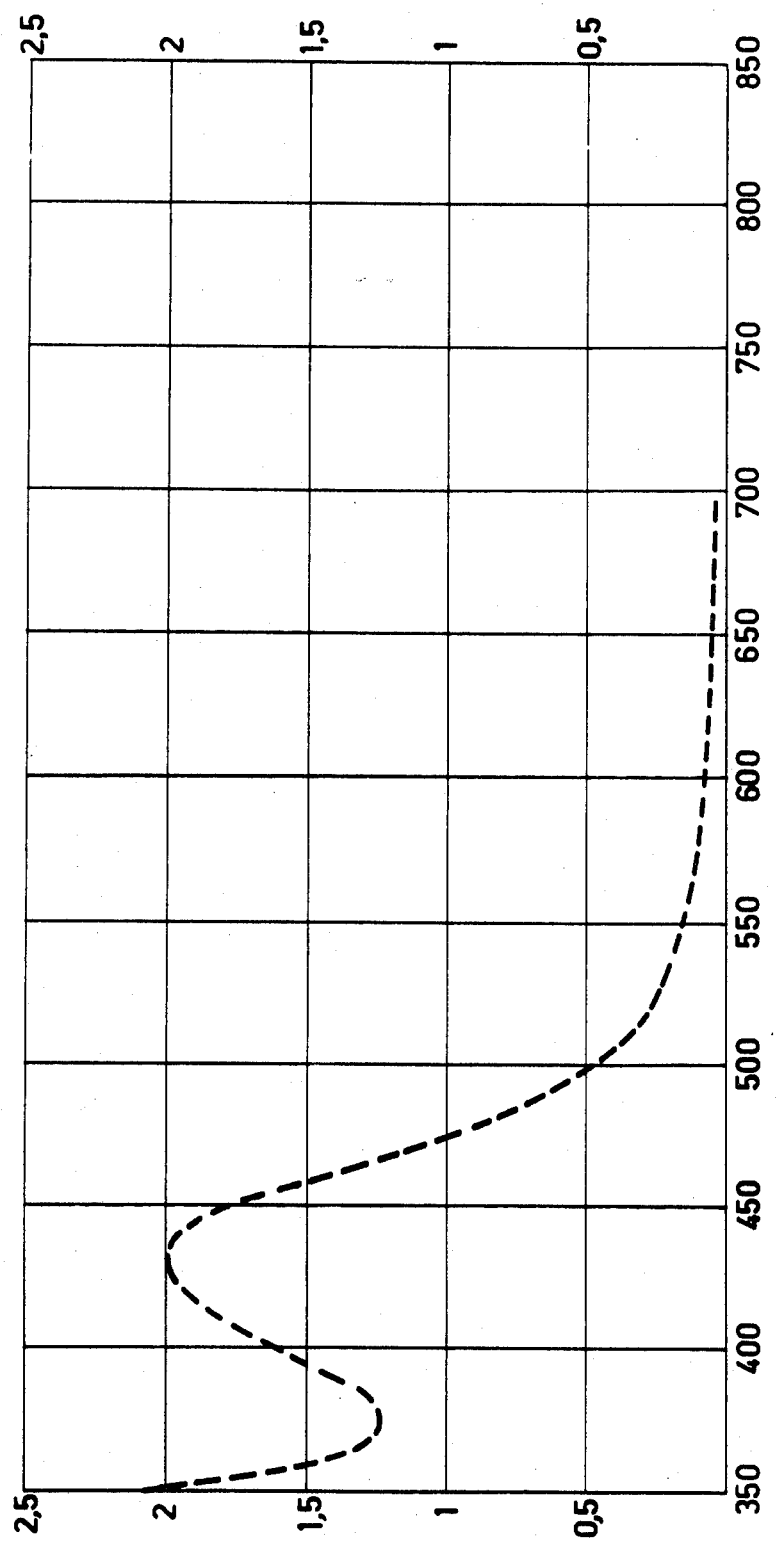

United States Patent [19]

Van Paesschen et al.

[11] 4,080,211

[45] Mar. 21, 1978

[54] POLYMERIZATION OF MONOMERIC COLOR COUPLETS

[75] Inventors: August Jean Van Paesschen, Antwerp; Jan Jozef Priem, Berchem-Antwerp, both of Belgium

[73] Assignee: AGFA-GEVAERT N.V., Mortsel, Belgium

[21] Appl. No.: 598,218

[22] Filed: Jul. 23, 1975

Related U.S. Application Data

[60] Continuation of Ser. No. 511,004, Oct. 1, 1974, abandoned, which is a continuation of Ser. No. 232,458, Mar. 7, 1972, abandoned, which is a continuation-in-part of Ser. No. 806,004, Feb. 28, 1969, abandoned, which is a continuation-in-part of Ser. No. 549,075, Feb. 28, 1966, abandoned, which is a division of Ser. No. 464,934, Jun. 18, 1965, abandoned.

[30] Foreign Application Priority Data

Jun. 23, 1964 United Kingdom .............. 25956/64
Jan. 1, 1965 United Kingdom .................. 173/65

[51] Int. Cl.$^2$ .......................... G03C 1/76; G03C 3/00; G03C 1/40
[52] U.S. Cl. ..................... 96/119 R; 96/74; 96/100 R; 526/89; 526/303; 526/332
[58] Field of Search ................. 96/100, 74, 114, 119; 260/29, 6 WQ; 526/72, 88, 89, 303, 332; 428/500, 522

[56] References Cited

U.S. PATENT DOCUMENTS

| | | | |
|---|---|---|---|
| 2,563,524 | 8/1951 | Flowers et al. | 260/83.7 |
| 2,976,294 | 3/1961 | Firestine | 96/100 |
| 3,163,625 | 12/1964 | Firestine et al. | 260/310 A |
| 3,202,642 | 8/1965 | Hardy | 260/85.5 |
| 3,211,552 | 10/1965 | Chu et al. | 96/74 |
| 3,325,286 | 6/1967 | Nottorf | 96/87 |
| 3,356,686 | 12/1967 | Firestine et al. | 260/310 |
| 3,370,952 | 2/1968 | Dawson | 96/100 |

OTHER PUBLICATIONS

Kirk–Ottmer, Encyc. of Chem. Techn., vol. 16, © 1968, pp. 239 & 240.

Primary Examiner—David Klein
Assistant Examiner—Richard L. Schilling
Attorney, Agent, or Firm—William J. Daniel

[57] ABSTRACT

A process of making a color photographic material comprising a support and a layer comprising gelatin and as a color-coupling agent a water-insoluble homopolymer of a solid water-insoluble ethylenically unsaturated color coupling monomer or a water-insoluble copolymer of said monomer with a water-insoluble ethylenically unsaturated monomer, wherein the color-coupling agent is made by:

polymerizing an emulsion in water of a solution of a solid water-insoluble ethylenically unsaturated color coupling monomer capable of undergoing free radical addition polymerization at a temperature below the melting point of said monomer or a mixture thereof with a water-insoluble ethylenically unsaturated monomer, said solution being in a solvent for said monomer selected from the group consisting of organic solvents substantially inert with respect to said color coupling monomer and the free radical polymerization products thereof, liquid water-insoluble copolymerizable monomers and mixtures of such organic solvents and such liquid copolymerizable monomers.

7 Claims, 3 Drawing Figures

POLYMERIZATION OF MONOMERIC COLOR COUPLETS

This is a continuation, of Ser. No. 511,004, filed Oct. 1, 1974 which is a continuation of Ser. No. 232,458, filed Mar. 17, 1972, which is a continuation-in-part application of the application Ser. No. 806,004 filed Feb. 28, 1969, it being a streamlined continuation-in-part application of application Ser. No. 549,075 filed Feb. 28, 1966, now abandoned, the latter being in its turn a divisional application of application Ser. No. 464,934 filed June 18, 1965, now abandoned.

This invention relates to the production of polymers, more especially to a process for the emulsion polymerisation of certain monomers insoluble in water, to the latices prepared according to this process and to their application in different materials, for instance in photographic materials. This preparation method can also be applied to the synthesis of latex colour couplers, the application of which in a photographic material is not known hitherto.

Processes for the preparation of polymers by emulsion polymerisation offer many advantages over other polymerisation processes. As main advantages can be cited the production of high molecular weight polymers, the easy carrying off of the reaction heat in the polymerisation by means of inexpensive diluent, viz. water, the high polymerisation rate and the high yields obtained thereby. Latices having a high concentration of polymer, for instance up to 50% of solid substance, and possessing a relatively low viscosity can be repeated. Usable solutions of high molecular weight polymers, on the contrary, should contain but a few percent of polymer since otherwise the viscosity of the solutions soon grows too high.

Because of these many advantages it has been attempted to polymerise all monomers in emulsion. It has been found, however, that this is not possible always. This is the case for polymers that can be prepared only by a chemical modification of an existing polymer, for instance poly(vinyl butyral), which is obtained by the reaction of poly(vinyl alcohol) with butyraldehyde.

There are also monomers, which can be polymerised with difficulty to high molecular weight polymers by a free radical polymerisation mechanism such as isobutylene, α-methylstyrene, etc. Suchlike monomers are polymerised usually by means of catalysts, which initiate according to an ionic mechanism. Whereas an ionic polymerisation preferably should occur in anhydrous medium since the ionic catalysts and the growing ionic polymeric chain are deactivated immediately in aqueous medium, an emulsion polymerisation cannot be carried out by ionic initiation, but has always to rely on initiation by free radicals.

The possibilities for emulsion polymerisation of monomers are limited also by the fact that these monomers need be dispersed in liquid form. As the term "emulsion polymerisation" implies, it is first necessary for the monomer is to be dispersed in the form of oil droplets in the aqueous phase according to the theory that Harkins proposed on the emulsion polymerisation of styrene, and that qualitatively complies with the emulsion polymerisation of most other liquid monomers (J.Am.-Chem.Soc. 69, 1428 (1947); J.Polymer Sci. 5, 217 (1950)).

When a water-immiscible, organic monomer is dispersed in water in the presence of a tensio-active emulsifying agent, the monomer is mainly dispersed in droplets of a diameter of about 1 $\mu$ and these droplets are stabilised by emulsifier molecules. A little amount of the monomer, however, is solubilised in micelles formed by the emulsifier. Radicals formed by decomposition of a polymerisation catalyst initiate the polymerisation solely in the emulsifier micelles, which are thereby transformed progressively in polymer particles swollen by monomer. The monomer in these particles is gradually used up as polymerisation proceeds but is continuously renewed by diffusion from the monomer droplets through the aqueous phase. These monomer droplets are thus acting as highly dispersed reservoirs of monomer.

From the above theory of Harkins it is evident that polymerisable monomers, which are solid at the temperature of polymerisation, thus possessing melting points above this polymerisation temperature, and which are relatively insoluble in water, cannot be transformed to a polymer by emulsion polymerisation, mainly because they cannot diffuse through the aqueous phase in order to supply the monomer to the polymerisation centra.

It is an object of this invention to provide an efficient and practical process for the emulsion polymerisation and copolymerisation of ethylenically unsaturated monomers, which are relatively insoluble in water, which are capable of undergoing free radical addition polymerisation, and which are solid at the polymerisation temperature. Another object is to provide latices, which are very stable, have fine particle sizes and which are exempt from excess emulsifier. A further object is the application of the latices produced as will be further described.

A process has now been found for the emulsion polymerisation of water-insoluble, ethylenically unsaturated, solid monomers, which are capable of undergoing free radical addition polymerisation and have a melting point above the polymerisation temperature, which process comprises the steps of:

(a) dispersing said water-insoluble, ethylenically unsaturated, solid monomer and a solvent therefor in water containing known emulsifying agents, said solvent being taken from the group consisting of:

(i) organic solvents, which are substantially inert with respect to said water-insoluble, ethylenically unsaturated, high melting monomer and which do not interfere with the free radical addition polymerisation thereof, (ii) liquid water-insoluble, ethylenically unsaturated, monomers, which are copolymerisable with said ethylenically unsaturated solid monomer and (iii) mixtures of (i) and (ii), (b) adding to the liquid dispersion obtained by step (a) a known polymerisation initiator;

(c) and agitating under free radical polymerisation conditions until polymerisation has occurred.

It is impossible to polymerise these water-insoluble, ethylenically unsaturated, solid monomers according to a conventional emulsion polymerisation technique. Indeed, they are solid at the polymerisation temperature and cannot be obtained in the form of a liquid dispersion as is required by the theory of Harkins explained above.

The term "emulsion polymerisation" given in the above described process on the analogy with the conventional emulsion polymerisation techniques is not quite correct.

Whereas in conventional emulsion polymerisation use is made of a liquid hydrophobic monomer the monomers according to the present invention are crystalline products having a high melting point. In order to polymerise these products in the polymerisation medium they are dissolved in inert organic solvents or in copolymerisable hydrophobic monomers. The polymerisation of the monomers according to the invention would occur in a totally different way from that formulated in the theory of Harkins for conventional emulsion polymerisations. The polymer latex obtained in this way surprisingly has the aspect and the properties of a latex with conventional fluid monomers.

Although it was suggested already to polymerise such monomers that are insoluble in water and have a high melting point according to emulsion polymerisation techniques, the attention should be drawn to the fact that there is no indication whatsoever of the way wherein these monomers could be polymerised actually according to conventional emulsion polymerisation techniques. Any person with ordinary skill in the art would refrain immediately from emulsion polymerisation because these monomers are not fluid but solid at the polymerisation temperature and consequently cannot be emulsified in water according to conventional techniques.

By the term polymerisation temperature is understood the temperature at which the dispersion is maintained as long as polymerisation proceeds. This polymerisation temperature is determined with respect to the decomposition temperature of the catalyst(s) used. Catalysts or catalyst combinations are known, which allow reaction temperatures of −20° to 100° C and even higher. Consequently the emulsion polymerisation temperature range is very broad and may lie beyond 100° C if the polymerisation is carried out under pressure, or below 0° C if care is taken to prevent the water from freezing by adding antifreezing agents such as alcohols, ethylene glycol and the like. The main point in this invention is that the polymerisation temperature chosen should remain below the melting point of the ethylenically unsaturated solid monomer.

The following is a short and non-exhaustive summary illustrative of the many monomers, which are considered for emulsion polymerisation according to the process of this invention.

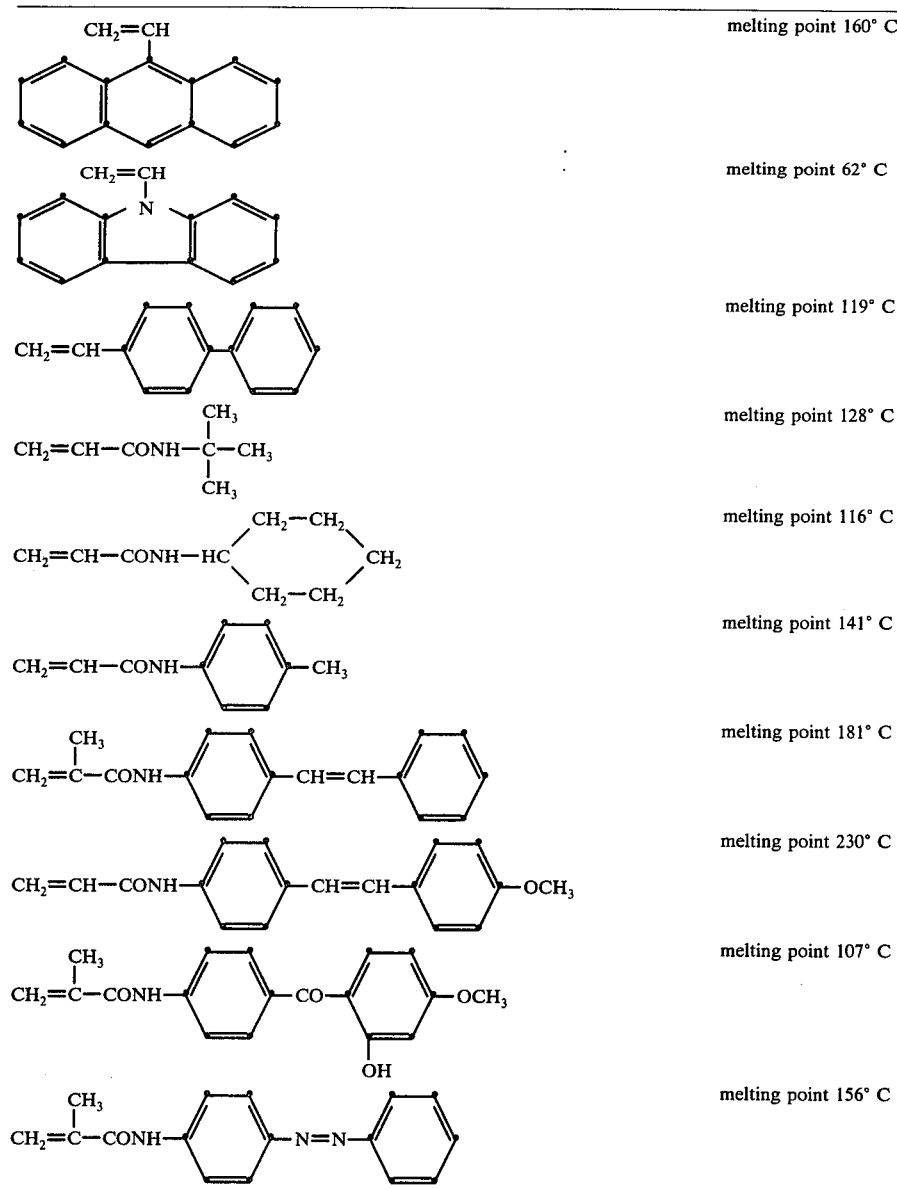

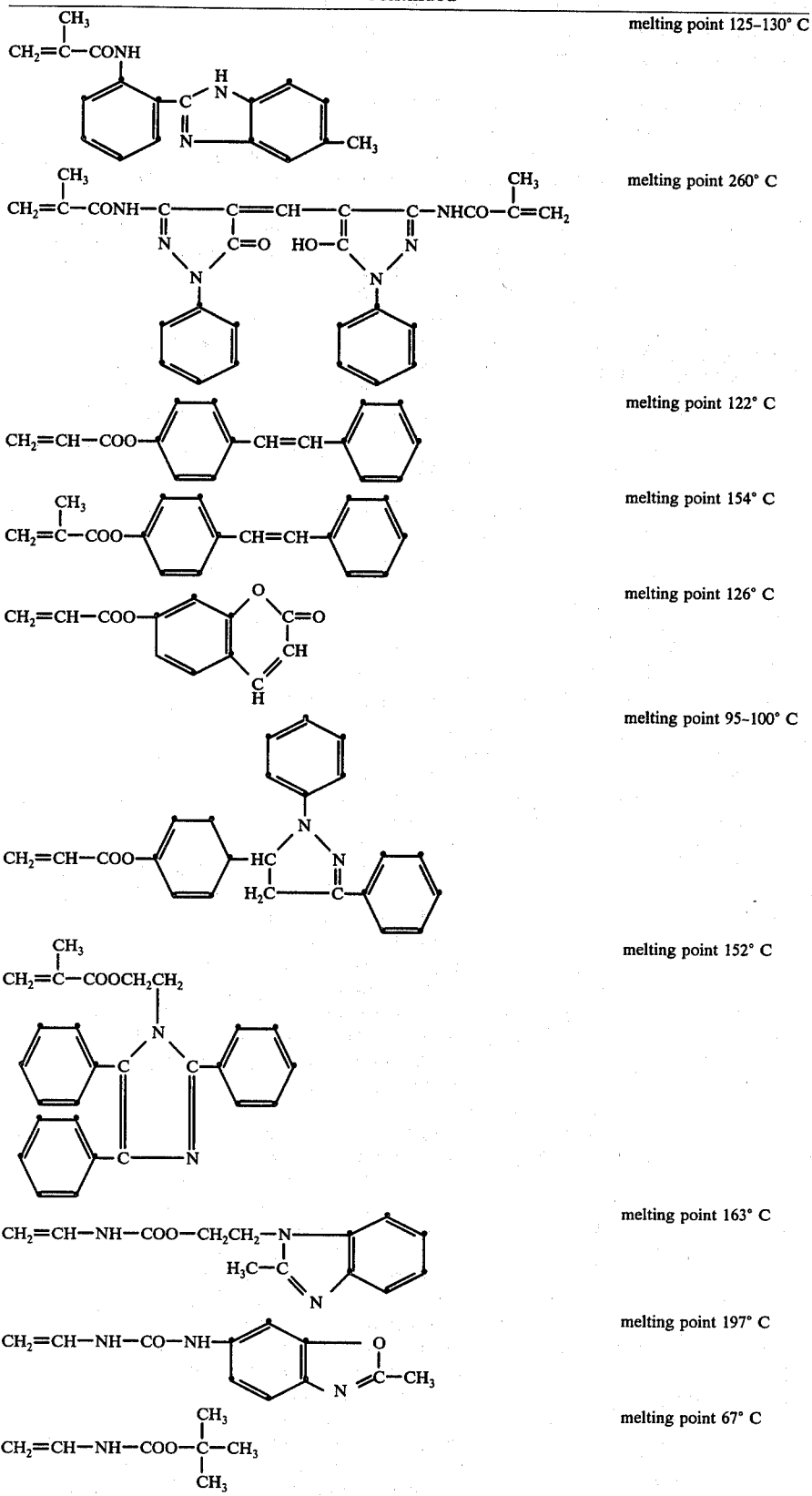
The compounds of the following formulae are examples of solid, ethylenically unsaturated, polymerisable colour couplers that can also be polymerised according to the process of the invention. As will be further explained the primary latices obtained can be added to aqueous gelatino-silver halide emulsions and the light-sensitive layers coated therefrom can be developed according to known photographic developing methods. After development yellow, magenta or cyan polymers are obtained.

(a) yellow-forming colour couplers:

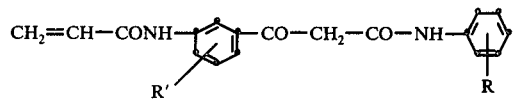

when R and R' are hydrogen, the melting point is 176° C;

when R is hydrogen and R' is chlorine in ortho position with respect to NH, the melting point is 144°–146° C, (R and R' may also be —SO₂CH₃, —SO₂NH₂, —O—alkyl).

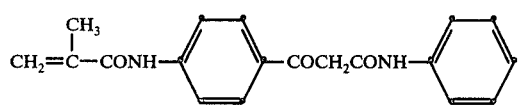

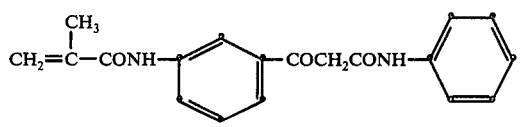

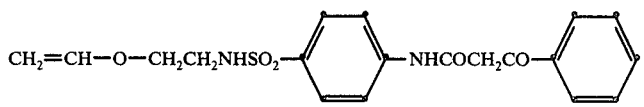

(b) magenta-forming colour couplers:

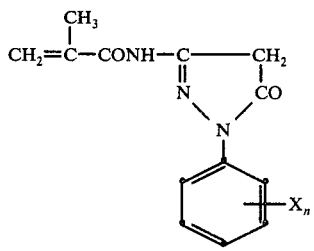

when n is 0, the melting point is 174° C, when n is 1 and X is bromine in ortho position, the melting point is 228°–230° C, when n is 3 and X represents chlorine in ortho, ortho' and para position, the melting point is 235° C (X may also be chlorine, —SO₂NH₂, —CN, —SO₂CH₃, —CH₃, and —OCH₃).

(c) cyan-forming colour couplers:

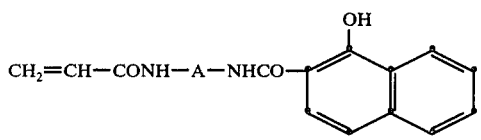

when A is —(CH₂)₂—, the melting point is 177° C,

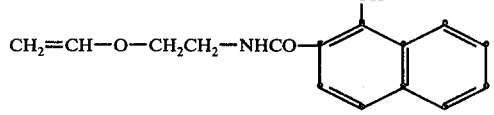

melting point 120.5–121° C

All these water-insoluble, ethylenically unsaturated, solid monomers have a relatively high melting point. These high melting points do not result from the ethylenically unsaturated radical but are due to the more or less complex organic substituent bound to the ethylenically unsaturated radical occasionally with insertion of an intermediate grouping.

These water-insoluble, ethylenically unsaturated, solid monomers can be represented by the formula:

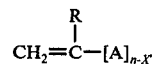

wherein:

R represents a hydrogen atom or a lower alkyl group melting point 163–165° C melting point 204–206°C melting point 116–117° C having 1 to 2 carbon atoms, X' represents a monovalent substituent imparting to the unsaturated compound water-insolubility and a high melting point, A represents a —CONH— group, a —NHCONH— group, a —NHCOO— group, a —COO— group, a —OOC— group, a —SO₂— group, a —CO—group, a —O— group or a bivalent radical in which an aliphatic, aromatic alicyclic or heterocyclic residue is linked to one of the above-mentioned bivalent groups, and n is 0 or 1.

In the above formula the substituent X' determines the properties of the ethylenically unsaturated monomer, especially with respect to its solubility and its melting point. If it is desired that after emulsion polymerisation the polymer obtained should show ultra-violet or infrared absorption, or if the polymer should be a dyestuff, a colour coupler, a fluorescent material, and the like, the substituent X' should be chosen accordingly.

When polymeric materials or polymeric layers are to be coloured, made fluorescent or ultra-violet or infrared absorptive, it was hitherto a usual practice to add to the polymers low molecular weight non-polymerisable organic products possessing the properties asked for. An obvious disadvantage of these organic products, however, was their immiscibility with the polymeric materials, their easy crystallisation, the diffusion of the low molecular weight product to the surface or to adjacent layers, etc.

The copolymerisation of special vinyl derivatives by polymerisation in bulk or in solution is well known. It is the object of this invention to propose a technique that allows the incorporation of solid vinyl derivatives in a polymer chain by emulsion polymerisation processes.

Consequently the organic substituents represented by X in the above formula, are not determined by their chemical composition, but only by two physical properties, viz. first that they raise the melting point of the whole ethylenically unsaturated, polymerisable monomer above the polymerisation temperature, and secondly that they render the monomer relatively insoluble in water.

The way, in which the ethylenically unsaturated, polymerisable ethylene or isopropylene group is linked to the substituent X', is of minor importance in this invention. The good polymerisability of the total monomer, however, is of paramount importance.

The first step of the process of this invention can be performed according to different methods. In a first embodiment the water-insoluble, ethylenically unsaturated, solid monomer is dissolved in the solvent irrespective of the fact that the solvent is an organic or a liquid water-insoluble, ethylenically unsaturated, copolymerisable compound or a mixture of both.

The solution thus formed is then added whilst thoroughly stirring to the aqueous reaction medium containing known emulsifying agents, while care is taken that the monomer subsists as a liquid dispersion in the reaction medium. If an organic solvent is used, it may be miscible or immiscible with water. This miscibility or immiscibility is not directly connected with the dissolving power the solvent must exert with respect to the solid, ethylenically unsaturated monomers. It is essential that the monomeric material remains as a liquid dispersion in the aqueous reaction medium.

The concentration of the water-insoluble, ethylenically unsaturated, solid monomer in the solvent or solvents employed may vary within wide limits. In the first place the concentration is determined, of course, by the dissolving power of the solvent or solvents with respect to the solid monomers. According to the process of the present invention the best results will be obtained with concentrations of solid monomers between 0.5 and 20%, preferably between 5 and 10% based on the weight of solvent employed.

When using an organic solvent it has to be substantially inert with respect to the ethylenically unsaturated, solid monomer and it should not interfere with the normal action of a free radical addition polymerisation. Preferably the organic solvent should be lowboiling so that it can easily be eliminated from the reaction medium by distillation during and/or after polymerisation.

Examples of suitable organic solvents are : lower alkanols of 1-4 carbon atoms such as methanol, ethanol and isopropanol, ketones such as acetone and methyl ethyl ketone, chlorinated hydrocarbons such as methylene chloride and chloroform, aromatic hydrocarbons such as benzene and toluene, cyclic ethers such as tetrahydrofurane and dioxane, esters such as methyl acetate and ethyl acetate, etc.

The water-insoluble, ethylenically unsaturated, solid monomer can also be dissolved in a liquid, ethylenically unsaturated, copolymerisable compound. The solution obtained is added, whilst vigorously stirring, to the aqueous reaction medium comprising known emulsifying agents. Copolymers will be subsequently obtained during the emulsion polymerisation step.

The concentration of solid monomer in the liquid, water-insoluble, ethylenically unsaturated, copolymerisable solvent may also vary within wide limits, but in the first place the concentration is determined, of course, by the dissolving power of the unsaturated solvent. The required proportion of the different monomers in the polymer to be obtained finally has an influence, of course, on the concentration to be chosen. Generally, however, concentrations of solid monomer between 0.5 and 50%, preferably between 10 and 30%, based on the weight of copolymerisable solvent employed will suffice in most cases.

All water-insoluble monomers capable of being copolymerised with the water-insoluble, ethylenically unsaturated, solid monomer and being liquid at the polymerisation temperature used, can be applied in principle. Yet, they should be able to dissolve the solid monomer sufficiently. As liquid, water-insoluble, ethylenically unsaturated monomers showning favourable dissolving properties can be mentioned : aromatic vinyl compounds such as styrene and its derivatives, e.g. vinyltoluene and vinylacetophenone; alkyl acrylates and alkyl methacrylates such as ethyl acrylate, n-butyl acrylate, 2-ethyl hexyl acrylate, also higher acrylates and methacrylates such as lauryl methacrylate; vinyl esters such as vinyl acetate, vinyl propionate and vinyl laurate; vinylidene chloride, etc.

It is self-evident that the water-insoluble, ethylenically unsaturated, solid monomer can also be dissolved in a mixture of an organic solvent and of a liquid, ethylenically unsaturated, copolymerisable compound, both as indicated above. In this case also copolymers are obtained by the subsequent emulsion polymerisation while the organic solvent can be distilled off.

Besides the above-mentioned liquid monomers manifesting a pronounced dissolving power, all other emulsionpolymerisable monomers can be added obviously in these preparation methods.

Suitable monomers comply with the general formula :

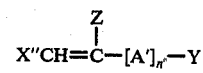

wherein :
n' is 0 or 1,
A' represents a methylene group,
X" represents a hydrogen atom, an alkyl group such as methyl, a carboxyl group, an alkylcarboxy group, or a carbamoyl group,
Y represents a hydrogen atom, a halogen atom, a methyl group, an alkylcarboxy group, a carbalkoxy group, a heterocyclic radical such as a pyridyl group, an aromatic radical such as a phenyl group, a carboxyl group, a sulpho group, an alkoxy group, an alkylcarbamyl group, an alkylsulphonyl group, a cyano group or a vinyl group, and
Z represents a hydrogen atom, a halogen atom, an alkyl group such as methyl, a cyano group or a carboxymethylene group in which the carboxyl group may be esterified with an alkanol of 1-4 carbon atoms.

According to the ethylenically unsaturated monomer to be polymerised, a large series of surface-active compounds is considered for being used as emulsifying agents, viz.
(1) soaps,
(2) sulphonates and sulphates,
(3) cationic compounds,
(4) amphoteric compounds,
(5) high molecular weight protective colloids.

A survey of these classes and their action is given in Belgische Chemische Industrie, 28, 16–20 (1963).

The amount of water in which the ethylenically unsaturated, solid monomer is to be polymerised is chosen such that the emulsion of the solid monomer together with other occasionally present copolymerisable monomer or monomers furnishes a latex having a concentration of solid substance between approximatively 2 and 50% by weight.

The addition to the aqueous reaction medium of the solution of the ethylenically unsaturated, solid monomer in an inert organic solvent or in a liquid, copolymerisable compound of in a mixture of both, is by preference performed slowly and whilst vigorously stirring. As mentioned above it is essential that during the addition, the ethylenically unsaturated solid monomer does not settle in solid state but subsists as a liquid dispersion in the aqueous reaction medium. This is dependent, of course, on the dissolving power of the solvent used (organic solvent and/or liquid copolymerisable compound) for the given, ethylenically unsaturated, solid monomer. In practice optimal results are attained by using a slight excess of solvent, by adding beforehand to the aqueous reaction medium a small amount of solvent in order to reduce the coagulation of the initial drops of monomer solution added first, and by polymerising preferably at a higher temperature, e.g., 80° C.

The above described procedure which comprises dissolving the solid monomer in an organic solvent, a polymerisable monomer or a mixture of both can be adapted, of course, to different techniques common in practice. For instance, the monomer solution can be added to the reaction medium at once, dropwise or in portions. Alternatively, as a first step, an aqueous emulsion of the solid monomer can be prepared outside the actual reaction vessel and the emulsion obtained can then be added to the reaction vessel continuously, dropwise or in portions.

According to a second embodiment of the first step of the process of this invention, a water-insoluble, ethylenically unsaturated, solid monomer and a solvent therefor are dispersed in water containing known emulsifying agents. As in the first embodiment the solvent may be an organic solvent, which is substantially inert with respect to the ethylenically unsaturated solid monomer, and should not interfere with the normal action of a free radical addition polymerisation. Alternatively of a free radical addition polymerisation. Alternatively the solvent may also be a liquid, water-insoluble, ethylenically unsaturated, copolymerisable compound or a mixture thereof with an organic solvent as defined above.

It is indifferent whether the solvent is dispersed solely in water followed by dispersion of the ethylenically unsaturated solid monomer, or the ethylenically unsaturated solid monomer is added first followed by the solvent, or they are both dispersed simultaneously.

As compared with the process of the first embodiment the present process offers the following advantages:

(1) it is no longer necessary to heat the solvent at rather elevated temperatures for dissolving the solid monomer, (2) less good solvents for the solid monomer are also applicable since the dissolving power of the dispersion of solvent in water is much higher than that of the solvent alone, and (3) larger amounts of solid monomer can be dissolved in the dispersion solvent/water than in the pure solvent alone for the same reason as set forth in (2).

In this second embodiment of the first step of the invention, the solvents, whether organic solvents, liquid ethylenically unsaturated copolymerisable compounds or mixtures of both, are the same as indicated above for the first embodiment. The emulsifying agents used are also the same.

The weight ratio of ethylenically unsaturated, solid monomer present to the solvent or solvents used may also vary within wide limits. Said ratio is determined first of all by the dissolving power of the solvent dispersion with respect to the solid monomer or monomers. The best results will be obtained with amounts of solid monomers varying between 0.5 and 50%, preferably between 5 and 30% relative to the amount of solvent or solvents used.

Just like in the first embodiment all other emulsion-polymerisable monomers can be added in this manner of execution of the first step of the process of the invention. These copolymerisable monomers are of the same formula as indicated above. The surface-active compounds used to facilitate the dispersion of the solid monomer are the same as in the first embodiment.

It is also essential that the ethylenically unsaturated solid monomer does not settle in solid state, but becomes present in the aqueous reaction medium in the form of a liquid dispersion. In order to facilitate the formation of this liquid dispersion, the aqueous medium can be warmed, but always below the boiling point of the solvent used.

In the second step of the process according to this invention known polymerisation initiating agents are added to the liquid dispersion obtained in the first step.

With some ethylenically unsaturated solid monomers a liquid dispersion is immediately formed after addition of the solvent and of the ethylenically unsaturated solid monomer to water containing known emulsifying agents. In this event the polymerisation initiator may be added together with the solvent and the ethylenically unsaturated solid monomer; there is no need for waiting till the full amount of solvent and of ethylenically unsaturated solid monomer has been dispersed. However, dependent on the nature of the ethylenically unsaturated solid monomer, it is sometimes necessary to warm and/or stir for a while before a true liquid dispersion is formed. In such cases it is necessary to add the polymerisation initiator only after the formation of the liquid dispersion, since otherwise a premature polymerisation would occur and a great risk of coagulation and precipitation of the polymer formed would exist.

The free radical polymerisation of ethylenically unsaturated solid monomers is initiated by addition to the monomer molecule of a free radical that has been formed either by thermic decomposition of chemical initiating agents or by the action of reducing agents on an oxidising compound (redox-initiating agents), or by physical action such as by ultra-violet light or other high energy radiation, ultrasonic waves, etc.

As main chemical initiating agents can be mentioned: persulphates (ammonium and potassium persulphate), hydrogen peroxide, 4,4'-azobis(4-cyanovaleric acid), etc., which products are water-soluble; azodiisobutyronitrile, benzoyl peroxide, chlorobenzoyl peroxide and other compounds that are insoluble in water.

Common redox-initiating agents are hydrogen peroxide-iron (II) salt, potassium persulphate-potassium bisulphate, cerium salt alcohol, etc.

A survey of the initiating agent and their action is given in the book of F. A. Bovey et al : Emulsion polymerisation, Interscience Publishers Inc., New York 1955, p. 59-93.

In addition to emulsifying agents and catalysts the aqueous reaction medium may comprise further emulsion polymerisation ingredients such as chain-transferring agents (mercaptan compounds, reactive halogen compounds, allyl compounds) and pH-adjusting agents (buffers, carbonates, acetates).

Theoretically a latex may contain up to approximatively 65% by weight of polymeric compound. In practice, however, proportions of 50 to 55% by weight are to be considered as maximum values and latices containing 40 to 45% by weight of solid substance with respect to the total amount of latex are used preferably. However, latices with lower concentrations of solid substance, e.g., 10% by weight, can be prepared more easily without involving coagulation, and thus latices of higher concentrations, which can hardly be prepared directly, are obtained by evaporation of lower concentrated latices.

Generally, the aqueous reaction medium comprises from 1 to 2% by weight of emulsifying agent with respect to the amount of monomer present. In some cases, however, this amount may be raised to 8% or even higher. The amount of catalyst is usually from 0.1 to 2% by weight, preferably approximatively 0.5% by weight of the ethylenically unsaturated solid monomer present.

Latices with very small particle size can be prepared according to the process of the invention. The particle size depends on the nature and the quantity of the emulsifying agent used, on the polymerisation temperature and on other variables. The influence of these variables on emulsion polymerisation is dealt with in Belgische Chemische Industrie 28, 9-22 (1963). The particle size varies from 0.05 to 2 $\mu$ though in certain circumstances even larger particles may be obtained.

Besides the method for preparing latex polymers, other methods are known for preparing polymers in aqueous medium, e.g., the dispersion of hydrophobic polymers and the dissolution of hydrophilic polymers in water. According to a classical method, the dispersion is performed by dissolving a hydrophobic polymer in an organic medium immicsible with water, dispersing the resulting solution in water and distilling the organic solvent whilst stirring. Suchlike dispersions of polymers, designated as secondary dispersions in contradistinction to the primary dispersions directly prepared by emulsion polymerisation of monomers, usually possess properties, which are less favourable than those of the primary dispersions. The particle size of secondary dispersions is often larger and the stability of suchlike dispersions is found to be inferior to that of the primary latices. In some applications, e.g., in photographic layers, these secondary dispersions are less useful because of their difficult compatibility with gelatin. When admixed with aqueous gelatin solutions they usually produce mat layers. The primary latices are usually quite compatible with aqueous gelatin solutions so that very clear layers can be obtained indeed.

In fact it was surprising and rather beyond expectations that with the process of the invention, which as mentioned before is not a conventional emulsion polymerisation technique, the same results concerning the fineness of the particles in the primary dispersions could be obtained. Since it was uncertain that the fineness of the particles would equal that of the particles in primary dispersions obtained according to conventional emulsion polymerisation techniques, it was rather surprising to discover that mixtures of the primary dispersions according to the invention with aqueous gelatin solutions could yield completely clear layers.

The application in practice such as in dye industry, paper industry, photographic industry, of primary latices according to the method of the invention offers many advantages over the use of these polymers in solution. In photographic layers, which nearly always comprise gelatin, the physical properties of the gelatin gel are not impaired by the addition before casting of the aqueous gelatin solutions of primary latices according to the invention, whereas the addition of polymers in aqueous solution partially destroys the gel structure of the gelatin and renders the gelatin-containing layers more brittle and dimensionally less stable.

Water-soluble polymers are far from being non-migratory in gelatin layers and can easily be washed out in the photographic baths unless the polymers possess a very high molecular weight involving, however, undesired increase of viscosity of the coating solution. Latices obtained according to the process of the invention, however, are water-insoluble and thus, when added to gelatin layers, cannot be washed out in the photographic baths. They are fully nonmigratory. Further, the influence of a latex on the viscosity of an aqueous gelatin solution is rather small since the viscosity of a latex in gelatin is not determined by the molecular weight of the polymers in the latex but by the particle size, the emulsifying agents used and the concentration of solid substance in the latex, variables that easily can be adapted to every application.

The attention should be drawn once again to the fact that it was uncertain that the primary dispersions obtained according to the unusual polymerisation technique of the invention would yield latices, which would be comparable as to their properties with the primary dispersions obtained according to conventional emulsion polymerisation techniques. Therefore, the negligible influence of the latices according to the invention on the viscosity of aqueous gelatin solutions is also very surprising indeed.

The solid monomers bearing the substituents described above possess a melting point beyond the polymerisation temperature. The process of the present invention for the emulsion polymerisation of solid monomers allows the production of primary latices from these solid monomers.

If the solid monomer possesses a chromophoric group, the primary latices may be applied to the preparation of polymers coloured in the mass.

If the solid monomer possesses a chromophoric group, which can be decomposed to a colourless group, the latex can be used as polymeric non-migratory dye in the antihalation layer of a photographic film, which antihalation layer can be eliminated during processing.

If the monomer possesses an ultra-violet absorbing group, the resulting final polymer is considered for being applied in an ultra-violet absorbing layer on a photographic colour material and offers optimal results in improving the light stability of the underlying colour image.

If the monomer possesses a substituent causing fluorescence, the latex can be added as optical brightening agent to layers, which in practice are used for improving the surface properties of paper. Suchlike latex can, of course, be added to the paper pulp.

If the monomer bears one or more functional groups chemically acting during the formation of the silver image or of a photographic colour image, the primary latex can be applied to a photographic light-sensitive emulsion. For instance, reducing substances for developing the silver image or activating the development can be utilised in latex form. It is equally possible to use latices having a reducing nature as neutralising agents for the oxidation products originating from the developing agent (products bearing functional substituents considered for this purpose are described i.a. in the British patent specification No. 861,138 filed Sept. 17, 1957 by Agfa AG, Leverkusen, Germany. It is likewise possible to prepare stabilising agents, sensitizing agents, developing activators, masking compounds, etc. in primary latex form and to apply them as such to photographic material.

If the monomer possesses an organic group known as a colour-coupling group in colour photography, the primary latices can be utilised as non-migratory colour couplers.

Colour couplers in latex form applied in a photographic layer have no tendency to diffuse into adjacent layers and are ideally suited for being employed in multilayer photographic colour material and packet emulsions.

Because of their compatibility with gelatin, colour couplers in primary latex form are very suited for producing extremely transparent photographic materials. This is in contradistinction to dispersions of polymeric colour couplers insoluble in water that were not obtained by emulsion polymerisation and compatibility with gelatin is very small giving photographic materials with inferior clarity and transparency.

In order to be able to dissolve or disperse the high molecular weight colour couplers as hitherto known in the literature, organic solvents or alkaline solutions are needed. Special water-solubilising substituents must be built in in the structure of the polymer or of the colour coupler in order to obtain a favourable compatibility with gelatin and to make the polymeric colour couplers accessible to the aqueous developing agents. The dissolved polymers comprising these substituents usually adversely affect the bitleness and the dimensional stability of the gelatin layer just as well. At the same time the water-soluble polymeric colour couplers are more easily washed out in the photographic baths and they usually considerably increase the viscosity of the gelatin solution.

When compared to the polymeric colour couplers of the prior art, the advantages offered by the present polymeric colour formers are obvious. Upon admixture with the gelatin silver halide emulsion, a primary latex of a polymeric colour coupler furnishes perfectly non-migratory colour couplers. For reasons set forth above, the primary latex has little influence on the coating viscosity of the gelatin solution. Primary latices of colour couplers also allow to mix fully hydrophobic colour couplers with gelatin in such a way that very clear layers displaying excellent photographic properties are obtained.

The colour couplers of the invention, although being fully hydrophobic, can be developed in the usual aqueous developing baths, thereby giving normal colour intensities within fully usual developing times. This is attributable to the very small size of the latex particles, in general having a diameter of about 0.1 $\mu$.

The latex colour couplers still have other advantages over the known soluble macromolecular colour couplers. For instance, it is possible to introduce plasticizing groups in the polymeric colour coupler molecule by copolymerisation, resulting in a favourable influencing of the brittleness and flexibility of the layers into which the colour coupler latex has to be incorporated.

The following examples illustrate the invention.

EXAMPLE 1

Poly[N-(1-phenyl-5-oxo-pyrazoline-3-yl)-methacrylamide]

In a reaction flask of 250 ccs are heated to 75° C 135 ccs of water and 4.1 ccs of a 10% aqueous solution of the sodium salt of oleyl methyl tauride. A solution of 34.2 mg of the sodium salt of 4,4'-azo-bis(4-cyanovaleric acid) in 5 ccs of water is added and 6.85 g of N-(1-phenyl-5-oxo-pyrazoline-3-yl)-methacrylamide, prepared according to the process described in United Kingdom Patent Specification No. 967,504 and dissolved in 110 ccs of ethanol, are added dropwise whilst thoroughly stirring. For facilitating the dissolution of the monomer in ethanol, the ethanol is heated at approximatively 70° C. The dropwise addition of the monomer solution is completed in about 30 min. In the dropping funnel the monomer solution is heated at approximatively 60° C in order to prevent the monomer from crystallizing. During the dropwise addition an azeotropic mixture of water and ethanol is distilled off. Subsequently 14 mg of the sodium salt of 4,4'-azo-bis(4-cyanovaleric acid) in 5 ccs of water are added dropwise. The distillation of the azeotropic is then continued and the resulting latex is stirred for 2 hours, heated, concentrated by evaporation at 90° C, cooled and filtered. Yield : 21 ccs of latex with a concentration of 30% of polymer.

EXAMPLE 2

Poly[N-(1-phenyl-5-oxo-pyrazoline-3-yl)-methacrylamide]

In a three-necked flask of 250 ccs fitted with a stirrer, a nitrogen inlet, a dropping funnel, a thermometer and a fractionating column are successively placed 110 ccs of water, which has been boiled under nitrogen, and 4.1 ccs of a 10% aqueous solution of the sodium salt of oleyl methyl tauride. This new solution is rinsed with nitrogen and warmed till about 65° C.

Meanwhile, 6.85 g of N-(1-phenyl-5-oxo-pyrazoline-3-yl)-methacrylamide (see Example 1) are dissolved in 110 ccs of warm ethanol. This solution is added to the above solution of oleyl methyl tauride and the resulting solution remains completely clear.

The temperature in the flask is raised until the distillation starts (at about 80° C). From a dropping funnel containing as an initiator a solution of 68.5 mg of sodium salt of 4,4'-azo-bis(4-cyanovaleric acid) in 25 ccs of water is then added at once an amount of 5 ccs. The remainder of the initiator solution is dropwise added very slowly, while an azotropic mixture of alcohol and water distills over.

This distillation lasts 1 h while the temperature of the reaction mixture has to be raised continuously in order to keep the distillation going on. In the meantime the reaction mixture has obtained a milky appearance. When the last amount of azeotropic mixture distills, some precipitate (2.7 g) has formed in the flask. As soon as the distillation is finished, the latex is cooled and filtered. Yield: 105 ccs of latex with pH 6.4 and a concentration of 3.9% of polymer.

EXAMPLE 3

Poly[N-(1-phenyl-5-oxo-pyrazoline-3-yl)-methacrylamide]

In a reaction flask of 100 ccs fitted with a stirrer, a fractionating column, a nitrogen inlet and a dropping funnel are placed 40 ccs of water and 10 ccs of a 5% aqueous solution of sodium lauryl sulphate. The mixture is heated to 80° C and subsequently 25 mg of potassium persulphate in 10 ccs of water are added.

A solution of 5 g of N-(1-phenyl-5-oxo-pyrazoline-3-yl)-methacrylamide (see Example 1) in 50 ccs of tetrahydrofurane are added dropwise whilst thoroughly stirring. During this dropwise addition an azeotropic mixture of tetrahydrofurane and water is distilled off. When the addition is completed the mixture is stirred for another hour at 80° to 85° C while the azeotropic mixture is still distilling over. The mixture is stirred for 30 minutes yet at 95° C. The latex is then cooled and filtered. The resulting latex possesses a polymer concentration of 7%.

EXAMPLE 4

Copolymer of n-butyl acrylate and N-(1-phenyl-5-oxo-pyrazoline-3-yl)-methacrylamide In a reaction flask of 500 ccs are heated to 90° C 250 ccs of water and 9 ccs of a 10% aqueous solution of the sodium salt of oleyl methyl tauride.

Subsequently a solution of 62.5 mg of potassium persulphate in 10 ccs of water is added and the dropwise addition of a solution of 6.25 g of N-(1-phenyl-5-oxo-pyrazoline-3-yl)-methacrylamide (see Example 1) and 6.25 ccs of n-butyl acrylate in 80 ccs of ethanol is started. The temperature of the latter solution is maintained at 80° C in order to prevent the crystallization of the dissolved monomer. The dropwise addition is performed in 5 to 10 minutes whilst vigourously stirred and simultaneously an azeotropic mixture of ethanol and water is distilled off. After the addition of the monomer solution the mixture is stirred for 2 hours yet at 80° C and 25 mg of potassium persulphate in 5 ccs of water are added. Stirring is continued for 2 hours at 90° C.

The surplus n-butyl acrylate is then distilled off under reduced pressure and the latex is cooled and filtered. An amount of 1.25 g of precipitate remains on the filter. The concentration of solid substance in the latex is 11%.

The nitrogen analysis of the separated copolymer proves that it contains 68% by weight of combined N-(1-phenyl-5-oxo-pyrazoline-3-yl)-methacrylamide.

EXAMPLE 5

Copolymer of n-butyl acrylate and N-(1-phenyl-5-oxo-pyrazoline-3-yl)-methacrylamide In a reaction flask of 100 ccs fitted with a stirrer, a fractionating column, a dropping funnel and a nitrogen inlet, 40 ccs of water, 10 ccs of a 10% aqueous solution of the sodium salt of oleyl methyl tauride, and 5 ccs of chloroform are heated to 65° C and rinsed with nitrogen. Then a solution of 50 mg of potassium persulphate in 3 ccs of water is added, whereupon a solution of 5 g of N-(1-phenyl-5-oxo-pyrazoline-3-yl)-methacrylamide (see Example 1) and 5 ccs of n-butyl acrylate in 50 ccs of chloroform is added dropwise in 30 minutes whilst thoroughly stirring. In the mean time chloroform is distilled off. When nearly all of the chloroform is evaporated a small precipitate settles. After the addition of the monomer solution the mixture is stirred for an hour at 65° C and for another hour at 95° C. The latex formed is then cooled and filtered. An amount of 1.3 g of precipitate remains on the filter and the latex possesses a polymer concentration of 6%. The nitrogen analysis proves that the copolymer contains 47.7% of N-(1-phenyl-5-oxo-pyrazoline-3-yl)-methacrylamide.

EXAMPLE 6

Copolymer of n-butyl acrylate and N-(1-phenyl-5-oxo-pyrazoline-3-yl)-methacrylamide 32 ccs of water and 8.75 ccs of a 10% aqueous solution of the sodium salt of oleyl methyl tauride are heated to 90°-95° C whilst stirring and while conducting therethrough a slow nitrogen current.

To this mixture is added a solution of 97.5 mg of potassium persulphate in 5 ccs of water. A solution of 3.5 g of N-(1-phenyl-5-oxo-pyrazoline-3-yl)-methacrylamide (see Example 1) in 16 ccs of n-butyl acrylate is added at 140° C in eight small portions with intervals of approximately 30 sec. and whilst thoroughly stirring. During the addition the temperature is maintained at 140° C in order to prevent the first monomer from crystallizing After the addition, the mixture is stirred for 2 ½ h at 90°-95° C. The latex formed is cooled and filtered. Polymer concentration of the latex: 21%. The nitrogen analysis proves that the copolymer formed contains 29.7% of N-(1-phenyl-5-oxo-pyrazoline-3-yl)-methacrylamide.

EXAMPLE 7

Copolymer of n-butyl acrylate and N-(1-phenyl-5-oxo-pyrazoline-3-yl)-methacrylamide A mixture of 42 ccs of water and 48 ccs of a 10% aqueous solution of the sodium salt of oleyl methyl tauride is heated at 95° C whilst stirring and conducting therethrough a slow nitrogen current.

To this mixture is added a solution of 180 mg of the sodium salt of 4,4'-azo-bis(4-cyanovaleric acid) in 5 ccs of water. Thereafter a solution of 9 g of N-(1-phenyl-5-oxo-pyrazoline-3-yl)-methacrylamide (see Example 1) in 51 ccs of n-butyl acrylate heated to 130° C is added dropwise whilst vigourously stirring. The mixture is heated for 2 h whilst leading through nitrogen and a solution of 90 mg of the sodium salt of 4,4'-azo-bis(4-cyanovaleric acid) in 5 ccs of water is added. Heating is continued at 95° C for 2 ½ h whilst blowing through nitrogen. The reaction mixture is cooled and filtered.

Polymer concentration of the latex: 37.75%. The nitrogen analysis proves that the copolymer formed contains 13.5% of N-(1-phenyl-5-oxo-pyrazoline-3-yl)-methacrylamide.

EXAMPLE 8

Copolymer of ethyl acrylate and N-(1-phenyl-5-oxo-pyrazoline-3-yl)-methacrylamide In a three-necked flask fitted with a stirrer, a reflux condenser, a thermometer and a dropping funnel, are stirred 80 ccs of water and 1.6 g of the sodium salt of oleyl methyl tauride. To this solution are added 4 g of N-(1-phenyl-5-oxopyrazoline-3-yl)-methacrylamide (see Example 1). The mixture is stirred at room temperature while expelling the oxygen from the flask by the introduction of nitrogen. Then 16 g of distilled ethyl acrylate are added whilst raising the stirring speed. After some time a milky liquid is formed and solid product is deposited on the walls of the flask.

While stirring is continued, the contents of the flask is heated at 83°–84° C by means of a water bath. After 10 minutes a homogeneous suspension is obtained and all solid substance has disappeared from the wall of the flask. Then 100 mg of the sodium salt of 4,4'-azo-bis(4-cyanovaleric acid) in 5 ccs of water are added whereby polymerisation starts after a few minutes.

After 30 minutes the temperature in the flask is raised till 90° C and stirring is continued for another 30 minutes. Nitrogen is bubbled through to free the latex obtained from residual monomer and this is continued for 15 minutes. Thereupon the latex is allowed to cool till room temperature and centrifuged. A light brown latex having a concentration of 20% is obtained. By nitrogen analysis is found that the separated copolymer comprises 19% by weight of N-(1-phenyl-5-oxo-pyrazoline-3-yl)-methacrylamide.

The above prepared copolymer latex can be used as magenta-forming colour coupler in a photographic silver halide emulsion following the method described in Example 30 hereinafter and the emulsion obtained can likewise be coated on a baryta-coated paper support. The resulting material is exposed through a silver wedge and further treated as in the above mentioned Example. A magenta colour wedge with a good gradation and a good maximum density is obtained.

EXAMPLE 9

Copolymer of n-butyl acrylate, methacrylic acid and N-(1-phenyl-5-oxo-pyrazoline-3-yl)-methacrylamide In a three-necked flask of 250 ccs equipped with a stirrer, a reflux condenser, a thermometer, a nitrogen inlet and a heating jacket are placed:

175 ccs of distilled water, which has been boiled under nitrogen, 25 ccs of a 10% aqueous solution of the sodium salt of oleyl methyl tauride, 10 g of N-(1-phenyl-5-oxo-pyrazoline-3-yl)-methacrylamide (see Example 1), 10 g of methacrylic acid, which has been distilled under nitrogen, and 30 g of n-butyl acrylate, which also has been distilled under nitrogen.

The mixture is stirred for 10 min. at room temperature and then heated to 80° C. Thereupon a solution is added of 250 mg of the sodium salt of 4,4'-azo-bis(4-cyanovaleric acid) in 5 ccs of water. A slightly exothermic polymerisation takes place and the temperature rises to 92° C. After this exothermic phase, the reaction mixture is stirred for further 30 min. at 90° C and for further 15 min. at 95° C.

The formed latex is then freed from all residual volatile monomer by blowing a moderate nitrogen current through it, while stirring at 95° C and after having removed the reflux condensor. After having cooled and centrifuged, a 17% latex is obtained of pH 4.65. The analysis of the polymer gives 3% of nitrogen content, which points to the presence in the copolymer of 17.5% by weight of pyrazolone derivative.

EXAMPLE 10

Copolymer of ethyl acrylate and N-[1-(2,4,6-trichlorophenyl)-5-oxo-pyrazoline-3-yl]-methacrylamide.

27.85 g (0.1 mole) of 1-(2,4,6-trichlorophenyl)-3-amino-pyrazoline-5one and 15.7 g (0.15 mole) of methacrylic acid chloride are refluxed for 8 hours in 200 ccs of acetonitrile. Then the acetonitrile is evaporated and the resulting product is treated for 30 min. with 0.15 mole of 1N sodium hydroxide and 100 ccs of a mixture of ethanol and water (1:1). The whole is acidified with acetic acid and the product is recrystallized from a mixture of ethylene glycol monomethyl ether and ethanol. Yield: 15.7 g of the N-[1-(2,4,6-trichlorophenyl)-5-oxo-pyrazoline-3-yl]-methacrylamide monomer. Melting point: 235° C.

In a flask fitted with a stirrer, a condenser, a nitrogen inlet and a thermometer are placed 70 ccs of distilled water, which has been boiled under nitrogen atmosphere, and wherein 1.6 g of the sodium salt of oleyl methyl tauride is dissolved. Further 4 g of the monomer prepared above are added together with 16 g of ethyl acrylate and 100 mg of the sodium salt of 4,4'-azo-bis-(4-cyano-valeric acid). The suspension is heated till 82° C and stirred for 1 ¼ hour. In the mean time, after 1 hour of reaction, another 100 mg of the sodium salt of 4,4'-azo-bis(4-cyano-valeric acid) are added. After having stirred for another 1 ½ hour there is no reflux anymore of ethyl acrylate. The latex formed is allowed to cool till room temperature. It contains 2 g of solid substance. By nitrogen analysis is found that a copolymer is formed comprising 12.45% by weight of N-[1-(2,4,6-trichlorophenyl)-5-oxo-pyrazoline-3-yl]-methacrylamide.

As in Example 3 hereinafter the above copolymer latex can be used as a magenta-forming colour coupler in a photographic silver halide emulsion.

EXAMPLE 11

Copolymer of styrene and N-(1-phenyl-5-oxo-pyrazoline-3-yl)-methacrylamide

In a reaction flask of 200 ccs provided with a cooler, a dropping funnel and a nitrogen inlet are heated to 80° C 30 ccs of a 10% aqueous solution of the sodium salt of oleyl methyl tauride and 32.5 ccs of water.

Then a solution of 300 mg of potassium persulphate in 5 ccs of water is added. Thereafter a solution of 5 g of N-(1-phenyl-5-oxo-pyrazoline-3-yl)-methacrylamide (see Example 1) in 25 ccs of styrene at 130°–140° C is added dropwise in 30 min. whilst thoroughly stirring. During the latter addition this solution is maintained at a temperature beyond 100° C in order to prevent the crystallization of the monomer.

After the addition the latex is stirred for 1 hour at 80° C and a solution of 300 mg of potassium persulphate in 5 ccs of water is added. The mixture is then stirred for another hour at 95° C, cooled and filtered. Yield: 100 ccs of a latex having a polymer concentration of 26%.

The nitrogen analysis proves that the copolymer contains 15.3% of N-(1-phenyl-5-oxo-pyrazoline-3-yl)-methacrylamide.

EXAMPLE 12

Poly{N-[m-anilino-carbonyl-acetyl)-phenyl]-acrylamide}

In a reaction flask of 5 liters provided with a thermometer, a stirrer, a reflux condenser and a dropping funnel are placed 254 g of m-amino-benzoyl-acetanilide, 500 mg of m-dinitrobenzene, 2.5 liters of anhydrous acetone and 179 g of anhydrous diethylaniline. The m-dinitrobenzene is added as polymerization inhibitor and the diethylaniline as an acceptor for the hydrochloric acid formed during reaction.

The reaction mixture is heated to 50° C whilst stirring in order to obtain a homogeneous solution and this solution is cooled subsequently to room temperature. Then 100 g of acrylic acid chloride are added dropwise whilst stirring, thus causing an exothermic reaction. After the dropwise addition the solution is stirred for another 2 hours at reflux temperature, cooled, and poured in 10 liters of 1N HCl cooled with ice. When the deposited product is gelled it is dissolved again in approximately 2 liters of warm acetone and poured in 10 liters of 0.1N HCL. The product is washed with distilled water until completely exempt from chlorine, dried and recrystallized from butanone. Yield of N-[m(anilino-carbonyl-acetyl)-phenyl]-acrylamide: 200 g. Melting point: 177° C. Nitrogen analysis: calculated: 9.08% found: 8.9%.

This N-[m-(anilino-carbonyl-acetyl)-phenyl]-acrylamide is subjected now to emulsion polymerisation. For that purpose 250 ccs of water and 7.2 ccs of a 10% aqueous solution of the sodium salt of oleyl methyl tauride are heated to 85° C in a flask of 500 ccs. A solution of 12 g of N-[m-(anilino-carbonyl-acetyl)-phenyl]-acrylamide in 200 ccs of ethanol and a solution of 62.5 mg of azodiisobutyronitrile in 15 ccs of ethanol are added simultaneously through two dropping funnels. During this addition in 30 minutes, the mixture is throughly stirred and an azeotropic mixture of ethanol and water is distilled off. The monomeric solution in the dropping funnel is heated by means of an infrared lamp in order to prevent the crystallization of the monomer. After the addition a mixture of ethanol and water is distilled over 1 hour yet. The latex is then cooled and filtered. An amount of 35 ccs of latex having a concentration of 35% of solid substance is obtained.

EXAMPLE 13

Poly{N-[m-(anilino-carbonyl-acetyl)-phenyl]-acrylamide}

In a three-necked flask fitted with a stirrer, a nitrogen inlet, a dropping funnel, a thermometer and a fractionating column are placed successively 110 ccs of distilled water, which has been boiled under nitrogen and 4.1 ccs of a 10% aqueous solution of the sodium salt of oleyl methyl tauride. This solution is rinsed with nitrogen and heated till about 65° C. To this solution is added a solution of 6.85 g of N-[m-(anilino-carbonyl-acetyl)-phenyl]-acrylamide (see first part of Example 12) in 140 ccs of tetrahydrofurane. The reaction mixture becomes turbid. Its temperature is adjusted in such a way that a slow distillation sets in (about 64° C). From the dropping funnel, which contains as an initiator a solution of 68.5 mg of sodium salt of 4,4'-azo-bis(4-cyanovaleric acid) in 25 ccs of water, 5 ccs are added at once. The remainder of the initiator solution is added very slowly whilst tetrahydrofuran distills over, which lasts about 1 h. Meanwhile the temperature in the flask is raised gradually in order to keep the distillation going on. The reaction mixture has obtained a milky appearance. At the end of the distillation some oily product (about 2 g) deposits on the walls of the flask.

After having cooled and filtered, 95 ccs of a latex are obtained having pH 4.7 and a concentration of 5.5% of polymer.

EXAMPLE 14

Poly{N-[m-anilino-carbonyl-acetyl)-phenyl]-acrylamide}

In a flask of 500 ccs are placed 250 ccs of water and 7.5 ccs of a 10% aqueous solution of the sodium salt of oleyl methyl tauride at 80° C.

To this solution are added successively a solution of 62.5 mg of the sodium salt of 4,4'-azo-bis(4-cyanovaleric acid) in 5 ccs of water and 12.5 g of monomeric N-[m-(anilinocarbonylacetyl)-phenyl]-acrylamide (prepared according to the first part of Example 12) dissolved in 200 ccs of ethanol. The dropwise addition of the monomer solution is completed in 30 minutes. The monomer solution is heated during the addition in order to prevent crystallization of the monomer.

During the addition of the monomer solution the mixture is thoroughly stirred and an azeotropic mixture of ethanol and water is distilled off. After the addition a solution of 25 mg of the sodium salt of 4,4'-azo-bis(4-cyanovaleric acid) in 5 ccs of water is added yet. The latex is then stirred for another 4 hours at 90° C while continuing the distillation of the azeotropic mixture. The resulting mixture is cooled and 125 ccs of a 10% latex without precipitate are obtained.

EXAMPLE 15

Poly{N-[m-(anilino-carbonyl-acetyl)-phenyl]-acrylamide}

In a reaction flask of 500 ccs fitted with a stirrer, a fractionating column, a nitrogen inlet and a dropping funnel 250 ccs of water and 7.5 ccs of a 10% aqueous solution of the sodium salt of oleyl methyl tauride are heated to 80° C.

Subsequently a solution of 65 mg of the sodium salt of 4,4'-azo-bis(4-cyanovaleric acid) in 10 ccs of water and 25 ccs of butanone are added. Thereupon 12.5 g of the monomeric N-[m-(anilino-carbonyl-acetyl)-phenyl]-acrylamide (prepared as described in the first part of Example 12) dissolved in 100 ccs of butanone at 60° C are added dropwise in 30 min. whilst thoroughly stirring. During the addition the dropping funnel is heated in order to prevent the crystallization of the monomer. At the same time an azeotropic mixture of butanone and water is distilled off.

After the monomer solution has been added, a solution of 32.5 mg of the sodium salt of 4,4'-azo-bis(4-cyanovaleric acid) in 5 ccs of water is added yet and the resulting mixture is stirred while raising the temperature for distilling the azeotropic mixture.

The latex formed is heated for 1 h on a water bath at 95° C and it is concentrated to a polymer concentration of 10% by weight by blowing nitrogen therethrough.

EXAMPLE 16

Poly{N[m-(anilino-carbonyl-acetyl)-phenyl]-acrylamide}

1.6 g of sodium salt of oleyl methyl tauride is dissolved in 80 ccs of water whereupon 4 g of N[m-

(anilino-carbonyl-acetyl)-phenyl]-acrylamide (prepared as described in the first part of Example 12) and 16 ccs of ethyl acetate are added. While stirring a nitrogen current is bubbled through the mixture. After 15 min. the mixture is heated till reflux temperature (72° C) and 100 mg of the sodium salt of 4,4'-azo-bis(4-cyanovaleric acid), dissolved in 5 ccs of water, are added as initiator. Stirring is continued for 1 hour and then another 100 mg of the same initiator are added. Thereupon the mixture is stirred for 2 more hours at reflux temperature.

When the polymerisation has come to an end, the reflux condenser is removed from the reaction flask and the ethyl acetate is allowed to evaporate. The latex formed is cooled and filtered. Yield: 80 ccs of latex, the concentration of which is 4.9%.

EXAMPLE 17

Copolymer of n-butyl acrylate and N-[m-(anilio-carbonyl-acetyl)-phenyl]-acrylamide In a reaction flask provided with a stirrer, a cooler and a nitrogen inlet are placed 42 ccs of water and 48 ccs of a 10% aqueous solution of the sodium salt of oleyl methyl tauride. The solution is heated to 90°–95° C whilst bubbling with nitrogen through it.

To this solution are added successively a solution of 180 mg of the sodium salt of 4,4'-azo-bis(4-cyanovaleric acid) in 3 ccs of water and 10 g of N-[m-(anilino-carbonyl-acetyl)-phenyl]-acrylamide (prepared according to the process described in the first part of Example 12) dissolved in 45 g of n-butyl acrylate at approximatively 130° C. The latex is stirred for 45 min. at 90°–95° C and another amount of 90 mg of the sodium salt of 4,4'-azo-bis(4-cyanovaleric acid) in 2 ccs of water is added. After stirring for 1 h this treatment is repeated and the mixture is stirred for 1 ½ h.

The latex is separated from the residual monomer by blowing nitrogen therethrough. The latex is cooled to room temperature and filtered. No precipitate remains in the filter. Concentration of the latex: 40%. The analysis of the copolymer proves that it contains 18.4% of N-[m(anilino-carbonyl-acetyl)-phenyl]-acrylamide.

EXAMPLE 18

Copolymer of ethyl acrylate and N-[m-(anilino-carbonyl-acetyl)-phenyl]-acrylamide 80 ccs of water and 1.6 g of sodium lauryl sulphate are placed in a flask. To the solution formed are added 16 g of distilled ethyl acrylate. The mixture is stirred at room temperature while expelling the oxygen from the flask by introducing nitrogen. Thereupon 4 g of N-[m-(anilino-carbonyl-acetyl)-phenyl]-acrylamide (prepared as described in Example 12) and 100 mg of the sodium salt of 4,4'-azo-bis(4-cyano-valeric acid) are added whilst the stirring speed is accelerated. After some time a milky liquid is formed and solid substance is deposited on the walls of the flask.

While stirring is continued, the contents of the flask is heated by means of a water bath for 1 hour at 83°–84° C and then for 30 min at 95° C. A nitrogen current is bubbled through the hot latex formed to free it from residual monomer.

After 15 min. the latex is cooled till room temperature and centrifuged. The latex obtained comprises 21% of solid product. By nitrogen analysis is found that a copolymer is formed comprising 17.5% by weight of N-[m-(anilino-carbonyl-acetyl)-phenyl]-acrylamide.

The above prepared copolymer latex can be used as a yellow-forming colour coupler in a photographic silver halide emulsion as described in Example 32 hereinafter. After exposure to light, development and fixation, a yellow image results of good graduation and maximum density.

EXAMPLE 19

Copolymer of ethyl acrylate and N-[m-anilino-carbonyl-acetyl)-phenyl]-acrylamide To a solution of 1.6 g of sodium salt of oleyl tauride in 74 ccs of water are added 10 g of N-[m-(anilino-carbonyl-acetyl)-phenyl]-acrylamide (prepared as described in Example 12) in the form of small grains and 10 g of ethyl acrylate. The mixture is stirred for 10 min. while introducing nitrogen, whereupon the mixture is heated till 80° C whilst raising the stirring velocity. After having stirred the mixture for 10 min. at 80° C, 100 mg of the sodium salt of 4,4'-azo-bis(4-cyanovaleric acid) dissolved in a little water are added as an initiator. Stirring is continued for 1 hour whereupon another 100 mg of this initiator are added. The mixture is stirred for another 15 min. at 80° C and then for 30 min. at 90° C. By bubbling through nitrogen, the hot latex is freed from residual ethyl acrylate. Finally the latex is cooled and filtered. A clear latex comprising 1.8 g of solid copolymer is obtained. Concentration: 16%.

By nitrogen analysis is found that the copolymer comprises 48% by weight of N-[m-(anilino-carbonyl-acetyl)-phenyl]-acrylamide.

The copolymer latex can be used in the same way as described in Example 32 hereinafter and constitutes a yellow-forming colour former giving yellow images of good gradation and maximum density.

EXAMPLE 20

Copolymer of n-butyl acrylate and N-[β-(1-hydroxy-2-naphthoyl-amino)-ethyl]-acrylamide In a flask provided with a stirrer, a condenser, a dropping funnel and a calcium chloride tube are placed:

| | |
|---|---|
| chloroform (dry) | 415 ccs |
| N-(1-hydroxy-2-naphthoyl)-ethylene-diamine | 34 g |
| triethylamine (anhydrous) (as HCl-acceptor) | 14 g |
| m-dinitrobenzene (as polymerization inhibitor) | 25.5 mg. |

The mixture is stirred at 60° C whilst dropwise adding in 5 min. 13.5 g of acrylic acid chloride. The suspension becomes clear after having stirred it for 1 h at 60° C. The solution is then cooled and washed with water in a separating funnel. Subsequently the solution is concentrated and cooled, thus causing the crystallization of the product. The resulting product is recrystallized from isopropanol. Melting point: 176° C.

Analysis of nitrogen - calculated: 9.86% - found: 9.70% Yield: 35%.

In a reaction flask of 150 ccs are heated at 80° C 55 ccs of water and 12.5 ccs of a 10% aqueous solution of the sodium salt of oleyl methyl tauride. At the same time a slow nitrogen current is conducted through the solution. Subsequently 5 g of the above prepared monomer are dissolved in 20 ccs of n-butyl acrylate by heating to 130° C. This solution is added dropwise whilst thoroughly stirring, and a solution of 300 mg of potassium persulphate in 5 ccs of water is added likewise.

After stirring for 1 h at 80° C 300 mg of potassium persulphate dissolved in 5 ccs of water are added yet and the mixture is stirred for another 2 h at 95° C.

A latex exempt from precipitate and having a concentration of 22% of polymeric substance is obtained after cooling. The nitrogen analysis proves that the copolymer contains 21.5% by weight of combined N-[β-(1-hydroxy-2-naphthoylamino)-ethyl]-acrylamide.

EXAMPLE 21

Copolymer of styrene and N-[p-(4-methoxy-salicyloyl)-phenyl]-methacrylamide 17 g of p-(4-methoxy-salicyloyl)-aniline are dissolved in 100 ccs of anhydrous dioxane by heating at 60° C. To the warm solution are added 6.35 g of anhydrous pyridine (HCl-acceptor), 8.35 g of methacrylic acid chloride, and m-dinitrobenzene as polymerization inhibitor. After a short exothermic phase during which the temperature rises to 80° C, the mixture is stirred for 90 min. at 60° C thus causing the deposition of a precipitate in the reaction mixture. The mixture is then cooled and poured in 1 l. of 1N hydrochloric acid. The precipitate formed is hardened, dried, and recrystallized from acetonitrile.

Yield: 55%. Melting point: 107° C.

Nitrogen analysis: calculated: 4.5% found: 4.37%.

In a reaction flask of 100 ccs fitted with a stirrer, a condenser and a nitrogen inlet are dissolved 835mg of dodecylated oxydibenzene disodium sulphonate in 25 ccs of water. The mixture is heated to 80° C while conducting nitrogen therethrough.

A solution of 5 g of N-[p-(4-methoxy-salicyloyl)-phenyl]-methacrylamide (preparation see above) in 10 g of styrene is added at 100° C while stirring and thereupon a solution of 75 mg of potassium persulphate in 5 ccs of water.

An exothermic polymerisation occurs. After 30 min. the styrene odour has disappeared. The latex is then stirred for 2 h at 90°-95° C, cooled, and filtered. Concentration of the latex: 33.4%. The nitrogen analysis proves that the polymer contains 29.5% by weight of combined N-[p-(4-methoxy-salicyloyl)-phenyl]-methacrylamide.

EXAMPLE 22

Copolymer of dodecyl methacrylate and N-tert.butylacrylamide

A mixture of 25 ccs of water and 15 ccs of a 10% aqueous solution of the sodium salt of oleyl methyl tauride is heated to 80° C in a flask whilst rinsing with nitrogen.

To this mixture are added a solution of 75 mg of potassium persulphate in 3 ccs of water and a solution of 5 g of N-tert. butyl acrylamide, dissolved in 10 ccs of dodecyl methacrylate at 130° C. The resulting mixture is vigorously stirred and soon the polymerisation starts. The reagents are then stirred for 1 h at 80° C and for 30 min. at 95° C. The latex is cooled and filtered. After evaporation under vacuum of the residual monomer a latex having a polymer content of 24% by weight exempt from precipitate is obtained. The nitrogen analysis proves that the polymer contains 39% of N-tert.butylacrylamide.

EXAMPLE 23

Copolymer of styrene and 4-acryloxystilbene

A mixture of 59 g of 4-hydroxystilbene in 200 ml of purified dioxane and of 50 mg of dinitrobenzene as polymerization inhibitor is stirred for 2 h at 75° C in the presence of 57 ml of acrylic anhydride. The obtained clear solution is then cooled and poured in 1 l. of distilled water and neutralized with alkali. The precipitate is filtered, dried and subsequently recrystallized from ethanol. Yield: 48 g. Melting point: 122° C.

In a reaction flask of 100 ccs fitted with a stirrer, a reflux condenser, a dropping funnel, a thermometer and a nitrogen inlet 40 ccs of water and 10 ccs of a 10% aqueous solution of the sodium salt of oleyl methyl tauride are heated to 80° C whilst blowing a slow nitrogen current through the solution.

Thereupon a solution of 50 mg of potassium persulphate in 3 ccs of water and a solution of 1 g of 4-acryloxystilbene in 10 ccs of styrene are added successively whilst vigorously stirring. Polymerisation starts nearly immediately. After the addition, the latex formed is stirred for 75 min. at 80° C and for 30 min. at 95° C, cooled and filtered. A precipitate of approximately 50 mg has been formed. After distillation of the residual monomer, the polymer concentration of the latex is 13%. The nitrogen analysis proves that the copolymer contains 30% of combined 4-acryloxystilbene.

EXAMPLE 24

Copolymer of ethoxyethyl acrylate and 4-methacrylamidostilbene

To a solution of 25 g of 4-aminostilbene in 50 ccs of purified dioxane, prepared by heating to 65° C whilst stirring, are added dropwise 12.2 g of pyridine (as HCl-acceptor) and 17.95 g of methacrylic acid chloride.

The reaction is exothermic. After the exothermic phase the mixture is stirred for 1 h at 65° C. The product crystallizes. The mixture is then cooled and poured in 500 ml of 1N hydrochloric acid. The precipitate is washed with water, dried and recrystallized from ethanol. Yield: 75%. Melting point: 181° C.

Nitrogen analysis: calculated: 5.33% found: 5.22%

In a reaction flask provided with a stirrer, a condenser and a nitrogen inlet are placed 16 ccs of water and 16 ccs of a 10% aqueous solution of the sodium salt of oleyl methyl tauride at 80° C, whilst rinsing the solution with nitrogen. A solution of 1 g of 4-methacrylamidostilbene (prepared as set forth above) in 19 g of 2-ethoxyethyl acrylate, dissolved therein by heating to 120°-130° C, is added whilst thoroughly stirring. Then a solution of 40 mg of potassium persulphate in 5 ccs of water is added. The latex is stirred for 45 min. at 80° C, for 1 h at 95° C and freed from residual monomer. The mixture is cooled and filtered. No precipitate has been found. Concentration of the latex: 37%. Nitrogen analysis of the copolymer proves that it contains 7.4% by weight of combined 4-methacrylamido-stilbene.

EXAMPLE 25

Copolymer of ethyl acrylate and 7-acryloxycoumarin

To a solution of 20.34 g of 7-coumarinol in 300 ccs of anhydrous methanol, a solution of 5 g of sodium hydroxide in 100 ccs of methanol is added dropwise. The resulting solution is inspissated and the obtained sodium salt of 7-coumarinol is dried. A quantity of 23.4 g of this sodium salt is then dispersed in 150 ccs of dry acetone and a solution of 25.1 g of acrylic acid chloride in 20 ccs of acetone is added dropwise thereto at room temperature. The reaction is exothermic. After stirring for 2 h at room temperature the sodium chloride formed is filtered off and the resulting product is washed with acetone.

The monomer solution in acetone is concentrated by evaporating under vacuum and poured in 1 l. of water in which 10 g of sodium carbonate have been dissolved. The precipitate formed is filtered off and washed with water until the wash water is exempt from alkali. Yield: 72%. Melting point: 125°–126° C.

A mixture of 70 ccs of water and 18 ccs of a 10% aqueous solution of the sodium salt of oleyl methyl tauride is heated to 85° C in a flask. To this mixture is added a solution of 90 mg of potassium persulphate in 3 ccs of water. Then a solution of 3 g of 7-acryloxy coumarin in 15 ccs of ethyl acrylate, heated to 60° C in order to facilitate the dissolution of the monomer, is added in 5 min. whilst vigorously stirring. After having stirred the mixture for 1 h at 85° C, 45 mg of potassium persulphate in 5 ccs of water are added yet and the new mixture is stirred for 2½ h at 85° C.

During the filtration a little precipitate is separated. Yield: 85 ccs of latex having a polymer concentration of 12.5%.

EXAMPLE 26

Copolymer of ethyl acrylate and 7-acryloxy-coumarin

In a three-necked flask equipped with a stirrer, a condenser, a nitrogen inlet, a dropping funnel and a thermometer are placed successively:
25 ccs of water
6 ccs of sodium salt of oleyl methyl tauride
1.5 g of 7-acryloxy-coumarin, and
6 g of ethyl acrylate, distilled under nitrogen.

The mixture is stirred for 15 min. at room temperature whilst it is rinsed with nitrogen. Then it is quickly heated till 80° C and 37.5 mg of sodium salt of 4,4'-azo-bis(4-cyanovaleric acid) is added in the form of a 5% aqueous solution. The obtained mixture is stirred for 1 h at 80° C and then for 30 min. at 90° C. The formed latex is now freed from any residual volatile monomer by stirring at 90° C, whilst nitrogen is led through and the condenser is removed.

After having cooled and filtered, 35 ccs of latex are obtained of pH 3.9 and having a concentration of 18.5%. It is showed by analysis that the copolymer contains 216 parts by weight of 7-acryloxy coumarin for each 100 parts by weight of ethyl acrylate.

EXAMPLE 27

Copolymer of ethyl acrylate and N-vinylcarbazole

In a flask are placed 64 ccs of distilled water, which has been boiled under nitrogen, 16 ccs of a 10% aqueous solution of the sodium salt of oleyl methyl tauride and 15 g of N-vinylcarbazole (melting point: 62° C). This mixture is stirred at room temperature under nitrogen atmosphere. After having stirred for 5 min., 5 g of distilled ethyl acrylate are added. Whilst the reaction mixture is stirred its temperature is raised till 50° C. Thereupon are added a solution of 200 mg of potassium persulphate in 55 ccs of water and a solution of 77 mg of sodium bisulphite in 2 ccs of water. After a stirring period of 3 min. a slightly exothermic polymerization starts and the temperature rises to 55° C. The mixture is stirred for 2½ h at 50° C. A well filtrable latex is obtained, which on filtration leaves on the filter 1 to 1.1 g of residue. Yield: 110 ccs of latex having a concentration of 18%. Nitrogen analysis of the copolymer shows that it contains 73.3% by weight of N-vinylcarbazole.

EXAMPLE 28

Copolymer of ethyl acrylate and N-vinyl tert.butyl carbamate

In a flask are placed 32 ccs of distilled water, which has been boiled under nitrogen, 8 ccs of 10% aqueous solution of sodium salt of oleyl methyl tauride and 5 g of N-vinyl tert.butyl carbamate, which has been purified by sublimation at 67° C. The reaction mixture is stirred for 10 min. at room temperature whilst nitrogen is bubbled through.

Thereupon 5 g of distilled ethyl acrylate are added and the mixture is warmed till 40° C. Then, a solution of 100 mg of potassium persulphate in 3 ccs of water and a solution of 38.5 mg of sodium bisulphite in 2 ccs of water are added. The mixture is stirred for 24 h at 40° C. A well filtrable latex is obtained, which on filtration leaves on the filter about 100 mg of precipitate. Yield: 63 ccs of latex having a concentration of 16.5%. The analysis of nitrogen shows that the copolymer contains 47.5% by weight of N-vinyl tert. butyl carbamate.

EXAMPLE 29

Copolymer of ethyl acrylate and 4-methyacrylamido-azobenzene

To a solution of 4 g of recrystallized 4-aminoazobenzene (melting point 127° C) in 75 ccs of purified dioxane prepared at 60° C, is added a solution of 2.4 g of anhydrous pyridine (HCl-acceptor) and of 2.3 g of freshly distilled methacrylic acid chloride in 10 ccs of dioxane. The resulting solution is stirred for 90 min. at 60° C, whereupon the product starts settling.

The mixture is then cooled and poured in 500 ccs of 1N hydrochloric acid. The precipitated product is washed with water until exempt from chlorine and subsequently dried.

Yield: 4.1 g. Melting point: 156° C.
Nitrogen analysis: calculated: 15.85% found: 15.25%.

A mixture of 40 ccs of water and 10 ccs of a 10% aqueous solution of the sodium salt of oleyl methyl tauride is heated to 80° C under nitrogen atmosphere. A solution of 50 mg of potassium persulphate in 3 ccs of water and a solution of 1 g of 4-methacrylamido-azobenzene in 10 ccs of ethyl acrylate, the latter being slightly heated in order to facilitate the dissolution, are successively added whilst stirring.

The polymerization proceeds slowly. After 1 h the temperature is brought at 90° C and a solution of 25 mg of potassium persulphate in 3 ccs of water is added. The latex is stirred for 2 h at 90°–95° C and concentrated under reduced pressure to 25% by weight of content of solids. The nitrogen analysis shows that the polymer contains 15% by weight of combinated 4-methacrylamido azobenzene.

EXAMPLE 30

For comparing the properties of the primary latex colour coupler prepared according to example 15 with the known polymeric colour couplers, 25 ccs of 10% primary latex of example 15 are admixed whilst stirring with 25 ccs of 10% aqueous gelatin at 45° C. The resulting mixture is coated on a glass plate such that a layer weighing 40 g per sq.m. is obtained. Another part of the primary latex is freeze-dried, whereupon 250 mg of dry polymer obtained by evaporation of the liquid from the latex are dispersed in 8 ccs of water by adding an equivalent amount of alkali. This turbid solution is added to 25 ccs of a 10% aqueous solution of gelatin at 45° C whilst thoroughly stirring. The gelatin is then brough immediately to its normal pH-value of approximately 6.5 by means of acetic acid so that the polymer remains dispersed in the gelatin in the form of small granules. This gelatin mixture is coated in the same thickness as set forth above.

When comparing both layers the brightness of the layer comprising the primary latex colour coupler is found to be far higher than that of the layer comprising the polymer dispersed afterwards, even though this latter polymer has been used in a concentration of 10 times as small. For instance, a printed text is illegible through a glass plate on which is coated a gelatin layer comprising the secondary dispersed colour coupler if this plate is held a few centimeters above the text. However, with a glass plate coated with the primary latex colour coupler the printed text is found to be clearly legible.

After colour development, the layer comprising the primary latex colour coupler is regularly and intensively coloured. The wet layer comprising the secondary dispersion is coloured in a weaker and flockier way.

EXAMPLE 31

To 300 g of a silver chlorobromide emulsion (95% of chloride and 5% of bromide) comprising 60 g of gelatin and 0.11 mole of silver halide per kg of emulsion, this emulsion being sensitized with 10 mg of a known orthosensitising agent, are added 72 ccs of the primary latex of a copolymer of butyl acrylate and N-(1-phenyl-5-oxopyrazoline-3-yl)-methacrylamide obtained according to the process of example 6. After the addition to the resulting emulsion of ingredients known in photographic techniques such as hardeners, stabilising agents, wetting agents, etc., and after adjustment of the viscosity of the coating solution by the addition of water, a layer comprising 30 g of light-sensitive emulsion and 7.2 ccs of latex per sq.m. is applied to a baryta-coated paper support.

The resulting material is exposed through a silver wedge and developed according to the common colour paper processing sequence, i.e. 5 min. of colour development, 6 min. of fixing, 6 min. of bleaching, 15 min. of rinsing, 2 to 3 min. of hardening and glazing.

This way a magenta colour wedge with a good gradation and a good maximum density is obtained.

EXAMPLE 32

To 200 g of a silver iodobromide emulsion (1.5% of iodide) comprising 65 g of gelation and 0.33 mole of silver halide per kg of emulsion are added 39 ccs of the primary latex of the copolymer of n-butyl acrylate and N-[m-(anilinocarbonyl-acetyl)-phenyl]-acrylamide obtained according to the process described in example 17. To the resulting emulsion are added the common ingredients known in photographic techniques such as hardeners, stabilising agents, wetting agents, and so on.

The emulsion is diluted with water in order to attain the required coating viscosity and finally is applied to a baryta-coated paper support such that 20 g of light-sensitive emulsion and 3.9 ccs of latex are present per sq. m.

Processing is carried out as described in example 20. The resulting image is yellow and the gradation and maximum density are found to be good.

EXAMPLE 33

To 0.5 kg of a blue-sensitive silver halide emulsion containing 42.5 g of gelatin and 0.16 mole of silver bromoiodide (1.9 mole of iodide) per kg of emulsion are added 250 ccs of a 20% latex of the copolymer of n-butyl acrylate and N-[m-(anilino-carbonyl-acetyl)-phenyl]-acrylamide as prepared in example 17. After the addition of the commonly used hardening agents, stabilising agents and wetting agents, the emulsion is diluted with distilled water to 1 kg. The emulsion having a pH value of 6.1 is then applied to a cellulose triacetate support and dried.

A gelatin covering layer of 10 μ is coated on this emulsion layer.

After drying, the light-senstive material obtained is exposed to blue light and developed in a bath of the following composition:

| | |
|---|---|
| N,N-diethyl-p-phenylenediamine hydrochloride | 2.75 g |
| sodium sulphite (anhydrous) | 4 g |
| sodium carbonate (anhydrous) | 50 g |
| potassium bromide | 0.65 g |
| hydroxylamine hydrochloride | 3 g |
| sodium hexametaphosphate | 2 g |
| water to | 1000 ccs |
| | (pH = 10.6) |

The developed colour material is rinsed for 30 sec. and next fixed in an acid bath of the following composition:

| | |
|---|---|
| sodium thiosulphate (anhydrous) | 100 g |
| sodium sulphite (anhydrous) | 10 g |
| sodium bisulphite (anhydrous) | 15 g |
| water to make | 1000 ccs. |

The fixed material is then rinsed for 10 min. and bleached in a bath having the following composition:

| | |
|---|---|
| ethylenediamine tetraacetic acid sodium-iron(III) salt | 37.5 g |
| ethylenediamine tetraacetic acid sodium salt | 12.5 g |
| ammonium thiosulphate (anhydrous) | 110 g |
| ammonium thiocyanate (anhydrous) | 5 g |
| sodium sulphite (anhydrous) | 10 g |
| water to | 1000 ccs. |

Finally the bleached material is rinsed for 5 min. and stabilised in a bath having the following composition:

| | |
|---|---|
| equimolar mixture of sodium acetate and acetic acid | 3 g |
| sodium acetate | 12 g |
| 40 % aqueous solution of formaldehyde | 240 ccs |
| water to | 1000 ccs. |
| The material is dried. | |

A very clear yellow strip is obtained. The absorption curve of the dye obtained is represented in FIG. 1. The maximum of the curve lies at 435 nm. The microscopic examination of the cross section of the developed emulsion layer and gelation covering layer proves that the covering layer remained uncoloured. Consequently the fastness to diffusion of the latex colour coupler used is found to be excellent.

EXAMPLE 34

To 0.5 kg of a green-sensitized silver halide emulsion containing 42.5 g of gelatin and 0.16 mole of silver bromoiodide (1.9 mole % of iodide) per kg of emulsion are added 300 ccs of a 20.7% latex of the copolymer of n-butyl acrylate and N-(1-phenyl-5-oxo-pyrazoline-3-yl)-methacrylamide as prepared in example 6.

Figure 2:
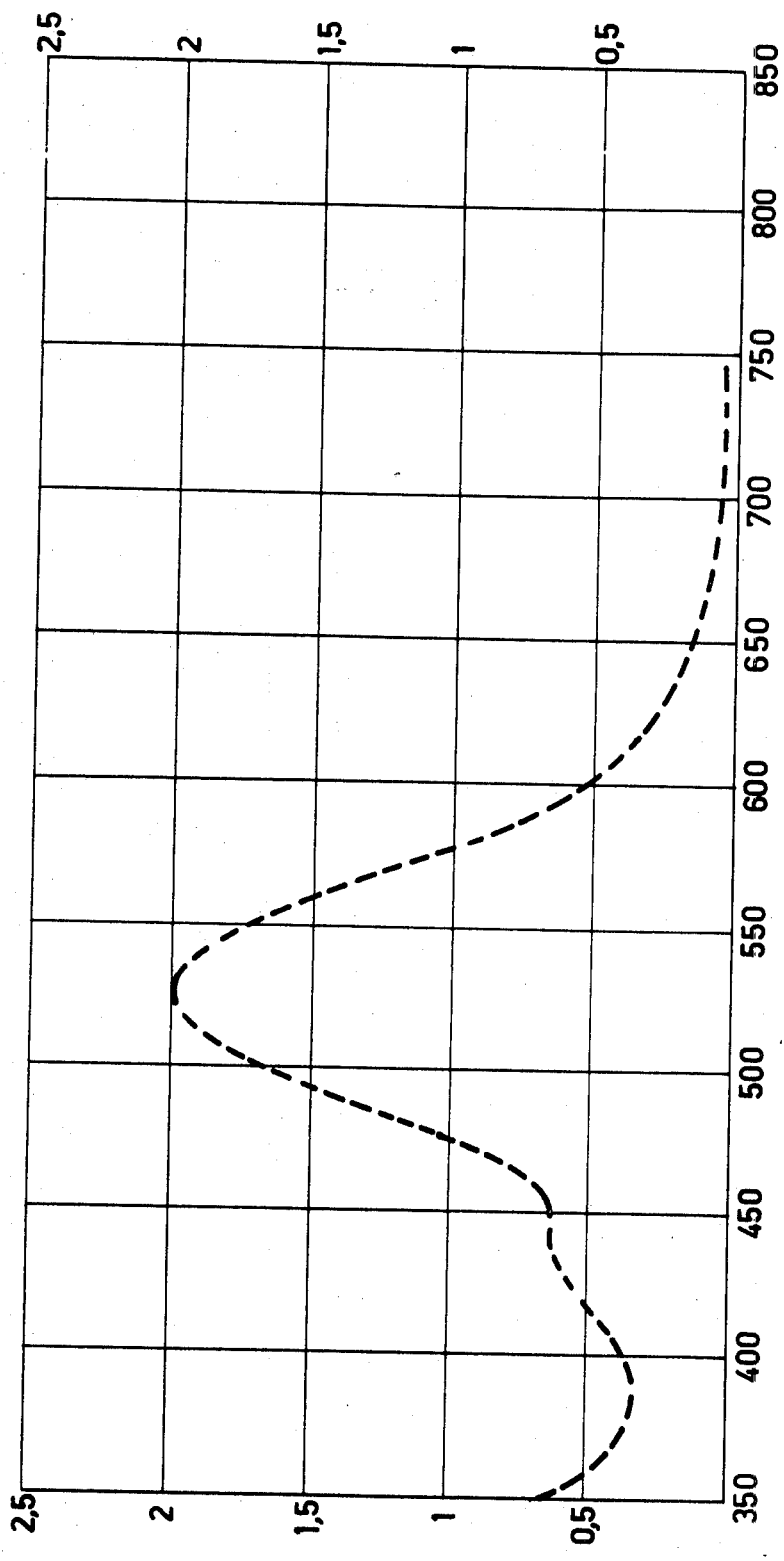

After the addition of the commonly used hardening agents, stabilising agents and wetting agents, the emulsion is diluted with distilled water to 1 kg. The emulsion having a pH value of 5.9 is then applied to a cellulose triacetate support and dried. A gelatin covering layer of 10 μ is coated on this emulsion layer. After drying, the light-sensitive material obtained is exposed to green light, developed and further processed as described in the foregoing example. A very clear magenta-coloured strip is obtained. The absorption curve of the dye obtained is represented in FIG. 2. The maximum of the curve lies at 530 nm.

The microscopic examination of the cross section of the developed emulsion layer and gelatin covering layer proves that the covering layer remained uncoloured. Consequently, the fastness to diffusion of the latex colour coupler used is excellent.

EXAMPLE 35

To 0.5 kg of a red-sensitised silver halide emulsion containing 42.5 g of gelatin and 0.16 mole of silver bromoiodide (1.9 mole % of iodide) per kg of emulsion are added 250 ccs of a 15% latex of the copolymer of n-butyl acrylate and N-[β-(1-hydroxy-2-naphthoylamino)-ethyl]-acrylamide as prepared in example 20.

After the addition of the commonly used hardening agents the emulsion is diluted with distilled water to 1 kg. The emulsion having a pH-value of 5.6 is then applied to a cellulose triacetate support and dried.

A gelatin covering layer of 10 μ is coated on this emulsion layer.

After drying, the light-sensitive material obtained is exposed to red light, developed and further processed as described in the foregoing example.

Figure 3:
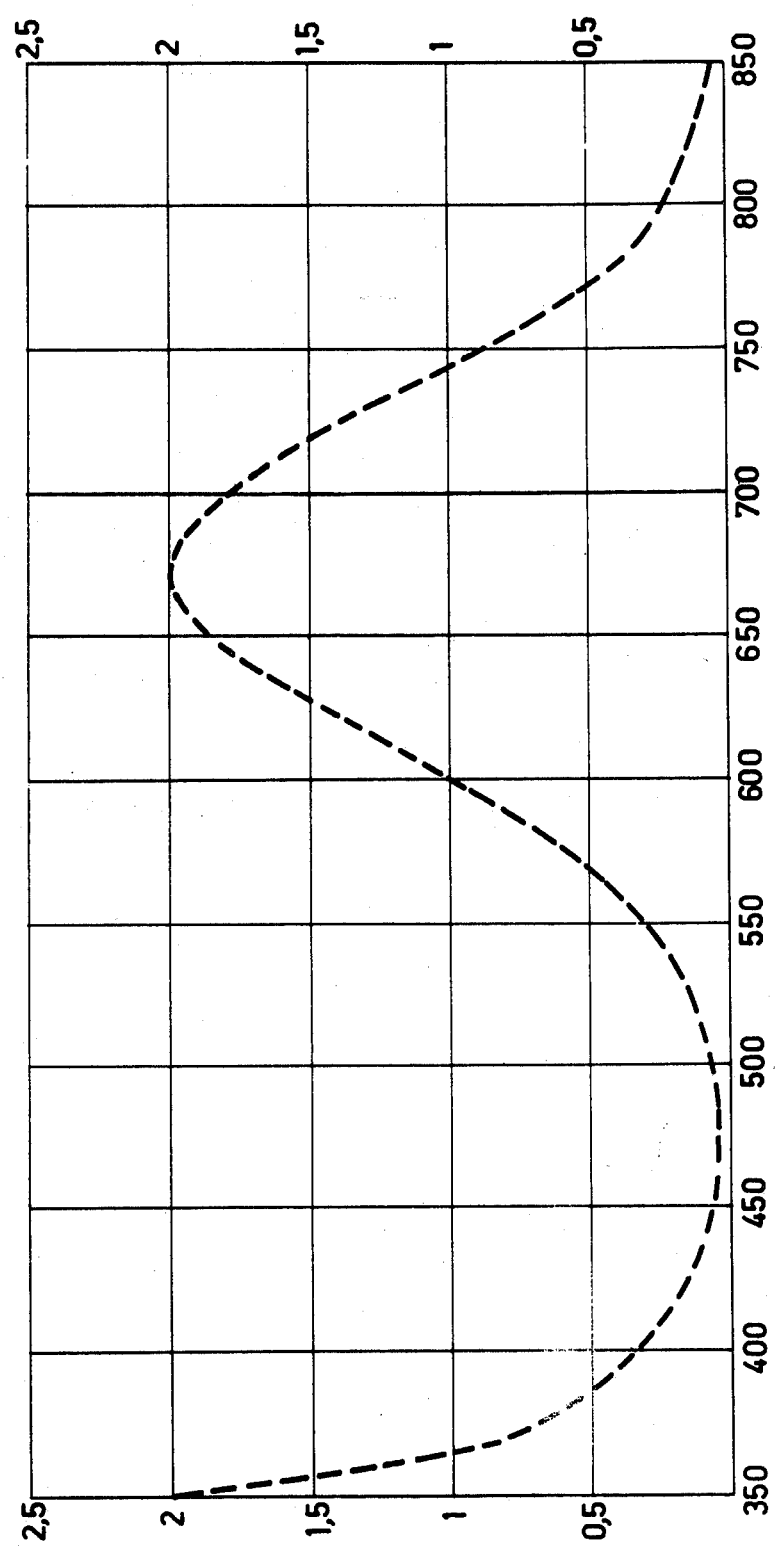

A very clear cyan strip is obtained. The absorption curve of the dye obtained is represented in FIG. 3. The maximum of the curve lies at 665 nm. The microscopic examination of the cross section of the developed emulsion layer and gelatin covering layer proves that the covering layer remained uncoloured. Consequently, the fastness to diffusion of the latex colour coupler used is excellent.

What we claim is:

1. A process of making a color photographic material comprising a support and a layer comprising gelatin and as a color-coupling agent a water-insoluble homopolymer of a solid water-insoluble ethylenically unsaturated color coupling monomer or a water-insoluble copolymer of said monomer with a water-insoluble ethylenically unsaturated monomer, which process comprises the steps of:

(1) forming an aqueous dispersion of up to 65% by weight of said polymeric color coupling agent by polymerizing an emulsion in water of a solution of a solid water-insoluble ethylenically unsaturated color coupling monomer capable of undergoing free radical addition polymerization at a temperature below the melting point of said monomer or a mixture thereof with a water-insoluble ethylenically unsaturated monomer, said solution being in a solvent for said monomer selected from the group consisting of organic solvents substantially inert with respect to said color coupling monomer and the free radical polymerization products thereof, liquid water-insoluble copolymerizable monomers and mixtures of such organic solvents and such liquid copolymerizable monomers;

(2) mixing an aqueous gelatin solution with the said aqueous dispersion of said polymeric color coupling agent; and (3) applying to said support a layer comprising said mixture of step (2).

2. A process according to claim 1 wherein the aqueous dispersion of up to 65% by weight of the polymeric color coupling agent is formed by the steps of:

(1) dispersing the solid-water-insoluble color coupling monomer and a solvent therefor in water containing at least one emulsifying agent;

(2) adding to the aqueous dispersion a polymerization initiator; and (3) agitating the dispersion under free radical polymerization conditions until polymerization has occurred.

3. A process according to claim 1 wherein the aqueous dispersion of said polymeric color coupling agent formed by emulsion polymerization has a solid concentration of about 2–50% by weight.

4. A process according ot claim 2 wherein said solid water-insoluble color coupling monomer and the solvent therefor are dispersed in water by first forming a solution of the monomer in the solvent and dispersing the solution formed in water.

5. A process according to claim 2 wherein said solid water-insoluble color coupling monomer and the solvent therefor are dispersed in water simultaneously or separately.

6. A color photographic material prepared by the process of claim 1.

7. A process according to claim 1 wherein said solid water-insoluble color coupling monomer corresponds to one of the general formulae:

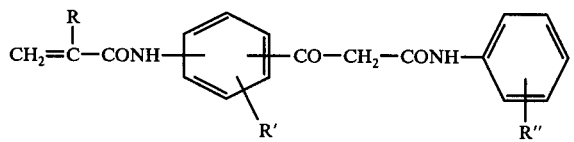

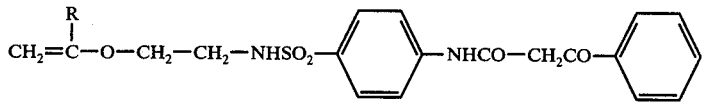

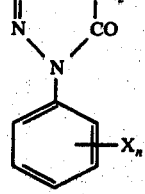 and
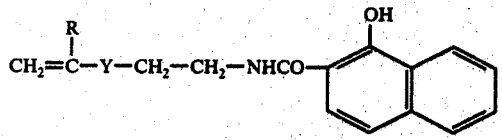
wherein
R is hydrogen or methyl,
R' and R" (same or different) represent hydrogen, halogen, —SO$_2$CH$_3$, —SO$_2$NH$_2$, —O—alkyl,
X represents halogen, —SO$_2$CH$_3$, —SO$_2$NH$_2$, —CN, —alkyl, —O—alkyl,
Y represents —O—, or —CONH—, and
n is 0, 1, 2 or 3.